(12) United States Patent
Barner et al.

(10) Patent No.: US 12,331,904 B2
(45) Date of Patent: Jun. 17, 2025

(54) LIGHTING DEVICE FOR VEHICLES

(71) Applicant: Hella GmbH & Co. KGaA, Lippstadt (DE)

(72) Inventors: Nils Barner, Lippstadt (DE); Hubert Flottmeyer, Wünnenberg (DE); Marcus Gattwinkel, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/746,257

(22) Filed: Jun. 18, 2024

(65) Prior Publication Data

US 2024/0426452 A1 Dec. 26, 2024

(30) Foreign Application Priority Data

Jun. 21, 2023 (DE) .......................... 102023116195.4

(51) Int. Cl.
| | |
|---|---|
| *F21S 43/241* | (2018.01) |
| *B60Q 3/62* | (2017.01) |
| *B60Q 3/64* | (2017.01) |
| *F21S 43/247* | (2018.01) |
| *F21V 8/00* | (2006.01) |

(52) U.S. Cl.
CPC ............. *F21S 43/241* (2018.01); *B60Q 3/62* (2017.02); *B60Q 3/64* (2017.02); *F21S 43/247* (2018.01); *G02B 6/0001* (2013.01); *B60Q 2400/30* (2013.01)

(58) Field of Classification Search
CPC .. F21S 43/241; F21S 43/247; B60Q 2400/30; B60Q 3/62; B60Q 3/64; G02B 6/0001

USPC .......................................................... 362/511
See application file for complete search history.

(56) References Cited

U.S. PATENT DOCUMENTS

| | | | | |
|---|---|---|---|---|
| 7,338,193 | B1* | 3/2008 | Zeiger | H04B 10/1141 |
| | | | | 362/558 |
| 7,419,287 | B2* | 9/2008 | Gasquet | F21V 5/045 |
| | | | | 362/555 |
| 2009/0201698 | A1* | 8/2009 | Klick | G02B 6/0028 |
| | | | | 362/555 |
| 2016/0259109 | A1* | 9/2016 | Wölfing | G02B 6/0075 |
| | | | (Continued) | |

FOREIGN PATENT DOCUMENTS

| | | |
|---|---|---|
| AT | 518552 A4 | 11/2017 |
| DE | 102010013931 A1 | 10/2011 |
| | (Continued) | |

*Primary Examiner* — Laura K Tso
(74) *Attorney, Agent, or Firm* — Husch Blackwell LLP

(57) ABSTRACT

A lighting device for vehicles has a light source and an optical waveguide, which itself includes a first optical waveguide segment with a light entry surface for light from the light source, a second optical waveguide segment with a light emission surface for the light. The emission surface has an optical structure, and a reflection segment between the first and second optical waveguide segments that has a reflective surface that reflects the light entering the optical waveguide toward the second optical waveguide segment. The light emission surface has an edge without an optical structure. The reflection surface has diffusion elements at the edge where part of the light entering the optical waveguide is deflected toward the second optical waveguide segment, and is emitted at the edge of the light emission surface in the second optical waveguide segment.

15 Claims, 2 Drawing Sheets

(56) References Cited

U.S. PATENT DOCUMENTS

2019/0078747 A1\* 3/2019 Wu .................... G02B 27/0905
2021/0213766 A1\* 7/2021 Lim ..................... G02B 6/0001
2022/0307670 A1\* 9/2022 Zhao ..................... F21S 43/243

FOREIGN PATENT DOCUMENTS

DE 102013100557 A1 7/2014
EP 3486558 A1 5/2019

\* cited by examiner

LIGHTING DEVICE FOR VEHICLES

CROSS REFERENCE

This application claims priority to German Application No. 10 2023 116195.4, filed Jun. 21, 2023, the entirety which is hereby incorporated by reference.

FIELD OF THE INVENTION

The invention relates to a lighting device for vehicles with a light source and an optical waveguide, which has a first optical waveguide segment with a light entry surface where the light from the light sources enters, a second optical waveguide segment with a light emission surface through which the light entering the optical waveguide is emitted, which has an optical structure, and a reflection segment containing a reflective surface between the first optical waveguide segment and the second optical waveguide segment, where the light entering the optical waveguide is deflected toward the second optical waveguide segment.

BACKGROUND OF THE INVENTION

A lighting device for vehicles is disclosed in DE 10 2013 100 557 A1, which has a light source and an optical waveguide, wherein the optical waveguide has a first segment with a light entry surface, a second segment with a light emission surface, and a reflection segment between the two other segments. The reflection segment deflects the light entering the optical waveguide and has an optical structure. The light emission surface has pillow-shaped elements forming this optical structure. These pillow-shaped elements cover the entire surface area of the light emission surface.

AT 518 552 A4 also discloses a lighting device that has a light source and an optical waveguide. The optical waveguide has a first segment with a light entry surface, a second segment with a light emission surface, and a reflection segment between the first and second segments, which deflects the light entering the optical waveguide toward the light emission surface. The light emission surface has a corrugated structure or is structured with prism elements, which cover the entire surface area of the light emission surface.

When these lighting devices are manufactured in an injection molding process, the optical structure on the light emission surface can be damaged by tools used to hold the edges thereof. To prevent damage where the tools hold the edge of the light emission surface, no optical structure is formed there. This can result in undesired optical effects when the light emission surface is viewed at a steep angle, e.g. LED hotspots, glittering effects, or an inhomogeneous appearance caused by the smooth surface on the edge of the light emission surface.

BRIEF SUMMARY OF THE INVENTION

The object of the present invention is to improve a lighting device for vehicles such that undesired optical effects can be prevented in a simple manner, when no optical structures are formed on one edge of the light emission surface.

This problem is solved by a light emission surface on the optical waveguide that has an edge without an optical structure, and the reflective surface of the reflection segment has diffusion elements where a part of the light entering the optical waveguide is deflected toward the second segment of the optical waveguide and is emitted at the edge of the light emission surface there.

The specific advantage of the invention is that undesired light effects are prevented in a simple manner without forming optical structures on the edge of the light emission surface. The fundamental concept of the invention is to place diffusion elements on the reflective surface where the light entering the optical waveguide would otherwise be reflected by a smooth surface such that it would exit the light emission surface at the edge without prior treatment. This prevents a concentration of light, or LED hotspots (light source hotspots), for example. Consequently, the light is diffused when it reaches the edge of the light emission surface.

In a preferred embodiment of the invention, this part of the reflective surface has diffusion elements where the light entering the optical waveguide would be reflected directly toward the edge of the light emission surface if it were smooth. Consequently, the light entering the optical waveguide is diffused at the region of the reflective surface that has these diffusion elements where it would otherwise arrive at the edge of the light emission surface without undergoing any diffusion. In an optical waveguide, portions of the light travel in a straight line, parallel to the direction in which the light is conducted, in the first and second segments of the optical waveguide. These portions of the light do not undergo total internal reflection, but instead, only are only reflected in their entirety at a reflective surface in the reflection segment.

In a preferred embodiment, the reflective surface projected at a right angle to the light emission surface covers or corresponds to the dimensions of the light emission surface. When the size of the reflective surface corresponds to the light emission surface, an edge of the reflective surface has no diffusion elements. When the projected reflective surface is larger than the light emission surface, the edge of the reflective surface without optical structures can also be spaced apart from an outer edge of the reflective surface.

In another embodiment of the invention, the width of the part of the reflective surface without optical structures is greater than the width of the edge of the light emission surface. This ensures that undesired lighting effects are prevented over the entire edge of the light emission surface.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
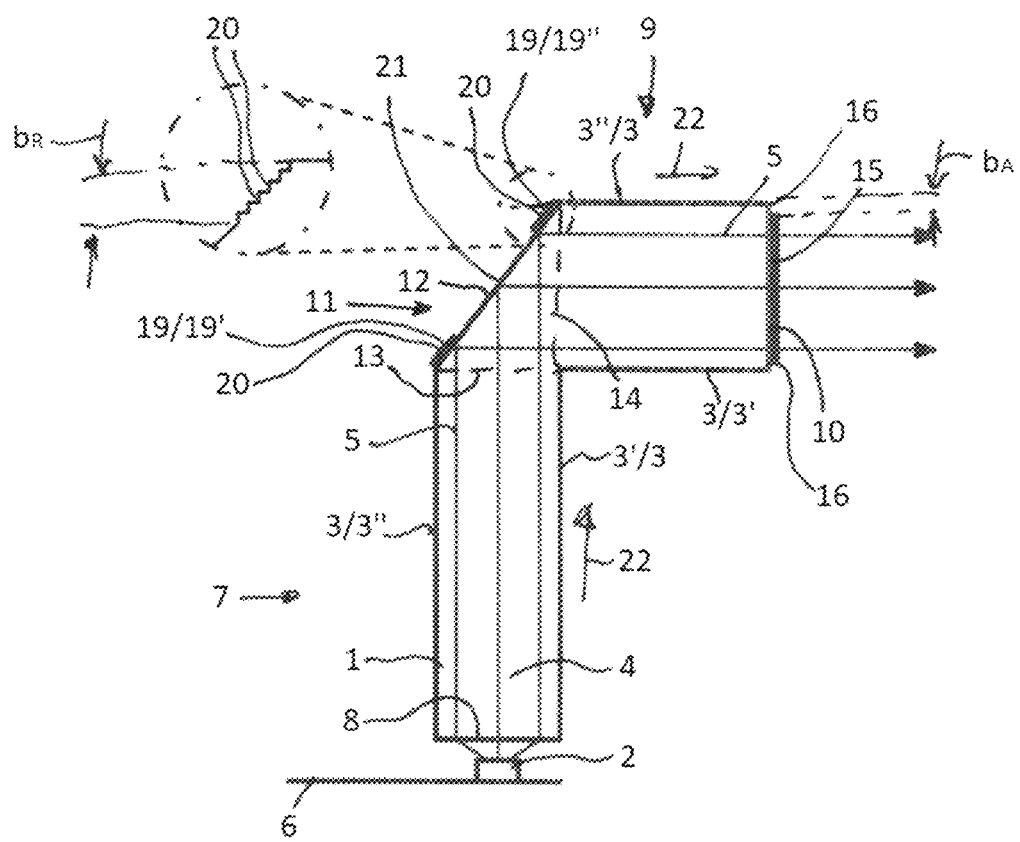
FIG. 1 shows a cross section of a lighting device according to the invention.

The lighting device according to the invention can be used for signal lights, e.g. daytime running lights, etc. The lighting device essentially contains an optical waveguide 1 and a number of light sources 2.

This the present example, the optical waveguide 1 is a flat waveguide with opposing flat sides 3 and narrow sides 4.

The light 5 entering the optical waveguide undergoes total internal reflection at the flat sides 3.

The light sources 2 are placed in a row on a substrate 6 (printed circuit board). The light sources 2 are LEDs.

The optical waveguide 1 has a first segment 7 with a light entry surface 8 on the side facing the light sources 2 where the light 5 from the light sources 2 enters the optical waveguide 1.

The optical waveguide 1 also has a second segment 9, which has a light emission surface 10 where the light entering the optical waveguide is emitted.

There is a reflection segment 11 of the optical waveguide 1 between the first segment 7 and second segment 9 thereof, which has a reflective surface 12 that deflects the light 5 as it exits the first segment 7 toward the second segment 9 of the optical waveguide.

The flat sides 3 and narrow sides 4 extend from the light entry surface 8 of the optical waveguide 1 to the light emission surface 10 thereof, wherein the flat sides 3 are parallel to one another except in the reflection segment 11. At this point, the inner flat side 3 of the first segment 7 transitions directly into the an inner flat side 3' of the second segment 9, while the outer flat side 3" of the first segment 7 of the optical waveguide is connected to the outer flat side 3" of the second segment 9 by the reflective surface 12.

The reflective surface 12 of the reflection segment 11 intersects the first segment 7 and second segment 9 of the optical waveguide at an angle of 45°. The light emission surface 10 is at a right angle to a light exit surface 13 of the first segment 7 and is parallel to the light entry surface 14 of the second segment 9 of the optical waveguide. The reflective surface 12 is flat in this exemplary embodiment. This reflective surface 12 could also be curved.

The size of the reflective surface 12 projected at a right angle to the light emission surface 10 corresponds to that of the light emission surface 10.

According to another embodiment of the invention, not shown in the drawings, the reflective surface 12, when projected at a right angle to the light emission surface 10, can also be smaller or larger than the light emission surface 10.

The optical waveguide 1 in the present example has an L-shaped cross section. Both the light entry surface 8 and the light emission surface 10 are rectangular.

The light entry surface 8 can be designed such that the light 5 entering the optical waveguide is parallelized. Alternatively, there can be a collimator between the light sources 2 and the light entry surface 8, with which the light 5 is parallelized. It then enters the preferably flat light entry surface 8 at a right angle thereto. Alternatively, light entry structures in the light entry surface 8 can be shaped such that only part of the light 5 entering the optical waveguide is parallelized. Another part of the light entering the optical waveguide is not parallel to the direction 22 in which the light is conducted, such that it undergoes total internal reflection on the opposing flat sides 3' and 3".

In any case, the light 5 entering the optical waveguide can contain portions that run in a straight line, parallel to the direction 22 in which the light is conducted in the optical waveguide 1, wherein this direction 22 is substantially perpendicular to the light entry surface 8 and/or the light emission surface 10. These are parts of the light that do not undergo total internal reflection, and are only reflected in their entirety at the reflective surface 12 of the reflection segment 11.

The light emission surface 10 has an optical structure 15 for diffusing the light 5 emitted there. Because the optical waveguide 1 is produced in an injection molding process, a tool must hold, or come in contact with, an edge 16 of the light emission surface 10 on the optical waveguide 1, resulting in a mechanical load to this edge 16. Consequently, the optical structure 15 becomes damaged at this edge 16, which has a negative effect on the light appearance. For this reason, no optical structures 15 are normally formed on the edge 16 of the light emission surface 10.

Figure 2:
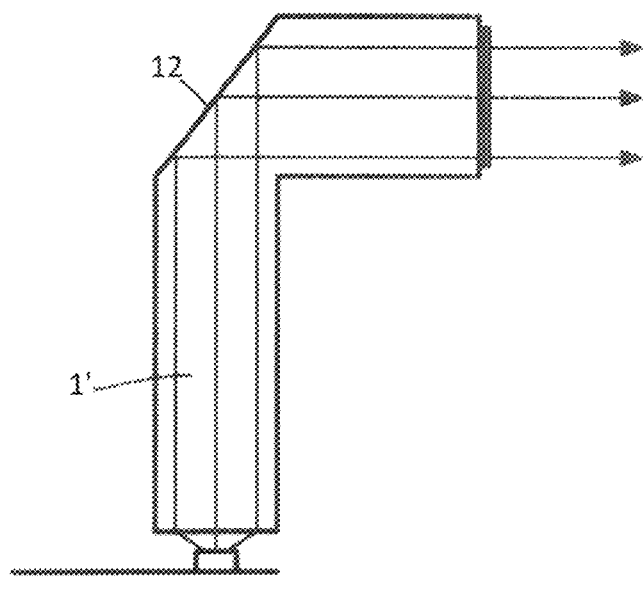
FIG. 2 shows a cross section of a lighting device from the prior art.
Figure 3:
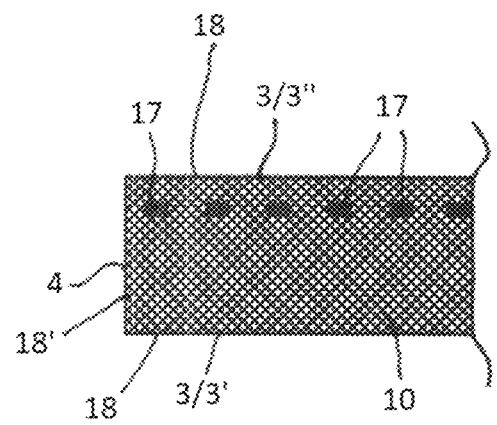
FIG. 3 shows a partial view of a light emission surface of the optical waveguide from the prior art shown in FIG. 2 from the front.

As FIGS. 2 and 3 show, this results in undesired light concentrations on the light emission surface 10 when viewed from certain angles, in particular LED hotspots 17, which extend along one side of the light emission surface 10. To prevent these LED hotspots 17, or light concentrations, i.e. inhomogeneities in the appearance, the invention provides that optical diffusion elements 20 are placed at the edge 19 of the reflective surface 12.

When the reflective surface 12 is projected at a right angle to the light emission surface 10, these diffusion elements 20 cover the edge 16 of the light emission surface 10 such that light 5 in the optical waveguide striking the edge 16 of the light emission surface 10 is diffused.

In the present exemplary embodiment, the light 5 entering the optical waveguide is deflected 90° by the reflective surface 12. The reflective surface 12 has diffusion elements 20 on the edge 19, which cover the reflective surface 12 at a right angle to the light emission surface 10 at the edge thereof. If the optical waveguide 1 was not bent, there would be no need for the diffusion elements 20 at the edge of the reflective surface 12. The important thing is that the diffusion elements 20 are placed on the reflective surface 12 where a part of the light 5 entering the optical waveguide is reflected such that it strikes the edge of the light emission surface 8 after entering the second segment 9, or other segment, of the optical waveguide.

It is assumed that the reflective surface 12 only has the diffusion elements 12 at the edge. The rest of the reflective surface 12 has no diffusion elements 20. The rest forms the main part 21 of the reflective surface 12, with which the light 5 is reflected without diffusion. The main part 21 of the reflective surface 12 is therefore smooth. The light 5 is reflected in its entirely at a flat surface formed by the main part 21. This main part 21 can also have a reflective coating.

In the present exemplary embodiment, the part of the edge 16 of the light emission surface 10 without an optical structure is only on opposite long sides 18 of the light emission surface 10, which also form an outer edge of the outer flat side 3" and inner flat side 3' of the second segment 9 of the optical waveguide. Two opposite edges 16 therefore form the edge 16 of the light emission surface 10. There are no parts of the narrow sides 18' of the light emission surface 10 that do not have optical structures. Consequently, the optical structure 15 extends continuously from the first narrow side 18' to the opposite narrow side 18' of the light emission surface 10.

The edge 19 of the reflective surface 12 therefore forms strips which are only formed by an edge 19' adjoining the light exit surface 13 of the first segment 7 of the optical waveguide, and an edge 19" adjoining the light entry surface 14 of the second segment 9 of the optical waveguide, which are parallel to one another. These edges 19' and 19" of the reflective surface 12 are parallel to the edges 16' and 16" of the light emission surface 10. The width $b_R$ of the edges 19', 19" is greater than the width $b_A$ of the edges 16', 16" of the light emission surface 10, i.e. sufficiently greater to ensure that light reflected at the edges 16, 16' of the light emission surface 10 only strikes the edge 19 at the edge segments 19', 19".

The optical waveguide 1 according to the invention therefore differs from the optical waveguide 1' from the prior art shown in FIG. 2 in that it has diffusion elements 20 at the edge 19 of the reflective surface 12, and the main part 21 of the reflective surface 12 remains smooth. The optical waveguide 1' from the prior art has a completely flat and smoot reflective surface 12.

The diffusion elements 20 can be produced by etching, with lasers, or by sandblasting. By way of example, the diffusion elements 20 can be erosion structures. By way of example, the diffusion elements 20 can be microdiffusion elements. The diffusion elements 20 can also be formed by a diffractive optical element. By way of example, the diffusion elements 20 can be formed by roughening the surface through sandblasting.

According to another embodiment of the invention, not shown, the optical waveguide 1 can also contain numerous reflection segments 11, or more than two optical waveguide segments. The shape of the optical waveguide 1 depends on the available installation space in the vehicle.

LIST OF REFERENCE SYMBOLS 1 optical waveguide
2 light sources
3, 3', 3" flat sides
4 narrow sides
5 light
6 substrate
7 first optical waveguide segment
8 light entry surface
9 second optical waveguide segment
10 light emission surface
11 reflection segment
12 reflective surface
13 light exit surface
14 light entry surface
15 optical structure
16, 16', 16" edge
17 LED hotspots
18, 18' long sides
19, 19', 19" edge
20 diffusion element
21 main part
22
$b_R$, $b_A$ edge width

We claim:

1. A lighting device for vehicles, the lighting device comprising:
   a light source; and
   an optical waveguide including:
      a first optical waveguide segment that has a light entry surface for light from the light source,
      a second optical waveguide segment that has a light emission surface for the light, wherein the emission surface has an optical structure, and
      a reflection segment between the first optical waveguide segment and second optical waveguide segment, the reflection segment having a reflective surface that reflects the light entering the optical waveguide toward the second optical waveguide segment;
   wherein the light emission surface of the optical waveguide has an edge without an optical structure,
   wherein the reflection surface of the reflection segment has diffusion elements at a region where part of the light entering the optical waveguide is deflected toward the second optical waveguide segment, and is emitted at the edge of the light emission surface in the second optical waveguide segment.

2. The lighting device according to claim 1, wherein the reflective surface of the reflection segment contains diffusion elements in the region where the light entering the optical waveguide would be reflected directly, without further total internal reflection, toward the edge of the light emission surface in the second optical waveguide segment if it were a smooth surface.

3. The lighting device according to claim 1, wherein the reflective surface has a main part that is smooth and has no diffusion elements.

4. The lighting device according to claim 1, wherein the region of the reflective surface borders on opposite sides of the main part of the reflective surface.

5. The lighting device according to claim 1, wherein the diffusion elements are at the region of the reflective surface, wherein a width (bR) of this region of the reflective surface is greater than a width (bA) of the edge of the light emission surface.

6. The lighting device according to claim 1, wherein the diffusion elements are formed by roughening, or by microdiffusion elements.

7. The lighting device according to claim 1, wherein the diffusion elements are formed by etching, with lasers, or by sandblasting the reflective surface.

8. The lighting device according to claim 1, wherein the light emission surface on the optical waveguide is perpendicular to the light exit surface on the first segment of the optical waveguide.

9. The lighting device according to claim 1, wherein the reflective surface is flat and intersects the light emission surface and the light exit surface of the first optical waveguide segment at an angle of 45°.

10. The lighting device according to claim 1, wherein the optical waveguide forms a flat waveguide with opposite sides where the light entering it undergoes total internal reflection.

11. The lighting device according to claim 1, wherein the light emission surface of the flat optical waveguide and the reflective surface thereof are rectangular.

12. The lighting device according to claim 1, wherein a projection of the reflective surface onto the light entry surface of the optical waveguide corresponds in at least one dimension to the light entry surface, and a projection of the reflective surface onto the light emission surface of the optical waveguide corresponds in at least one dimension to the light emission surface.

13. The lighting device according to claim 1, wherein a projection of the region of the reflective surface containing the diffusion elements onto the light emission surface of the optical waveguide covers the edge of the light emission surface.

14. The lighting device according to claim 1, wherein the optical waveguide has an L-shaped cross section, and has numerous LEDs forming the light sources.

15. The lighting device according to claim 1, wherein the light entry surface is designed such, or there is a collimator between the light sources and the light entry surface of the optical waveguide that is designed such, that at least part of the light entering the first optical waveguide segment is parallelized.

* * * * *